United States Patent
Shin et al.

(10) Patent No.: US 8,194,658 B2
(45) Date of Patent: Jun. 5, 2012

(54) TRANSMITTING AND RECEIVING METHOD AND APPARATUS IN REAL-TIME SYSTEM

(75) Inventors: Young-sam Shin, Yongin-si (KR); Seung-won Lee, Hwaseong-si (KR); Han-cheol Kim, Yongin-si (KR); Jeong-joon Yoo, Yongin-si (KR); Jae-don Lee, Paju-si (KR); Min-kyu Jeong, Seoul (KR); Keun-soo Yim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 389 days.

(21) Appl. No.: 11/979,737

(22) Filed: Nov. 7, 2007

(65) Prior Publication Data

US 2008/0165770 A1    Jul. 10, 2008

(30) Foreign Application Priority Data

Jan. 5, 2007 (KR) .................. 10-2007-0001644

(51) Int. Cl.
*H04L 12/56* (2006.01)
(52) U.S. Cl. ........................... 370/389; 370/250
(58) Field of Classification Search .................. None
See application file for complete search history.

(56) References Cited

U.S. PATENT DOCUMENTS

| 5,892,856 | A  | * | 4/1999  | Cooper et al. ............... 382/291 |
| 6,448,978 | B1 | * | 9/2002  | Salvador et al. ............. 715/741 |
| 6,801,943 | B1 |   | 10/2004 | Pavan et al. |
| 7,046,677 | B2 | * | 5/2006  | Monta et al. ............... 370/395.4 |
| 2004/0062262 | A1 |   | 4/2004  | Venteicher et al. |
| 2004/0160960 | A1 | * | 8/2004  | Monta et al. ............... 370/395.4 |
| 2004/0160971 | A1 | * | 8/2004  | Krause et al. ............... 370/412 |
| 2004/0170198 | A1 | * | 9/2004  | Meggers et al. ............. 370/514 |
| 2005/0083894 | A1 | * | 4/2005  | Tagawa ...................... 370/338 |
| 2006/0165088 | A1 | * | 7/2006  | Monta et al. ............... 370/395.4 |
| 2007/0253430 | A1 | * | 11/2007 | Minami et al. ............. 370/395.52 |

FOREIGN PATENT DOCUMENTS

| KR | 2002-0019697   | 3/2002 |
| KR | 10-2006-0068517 | 6/2006 |
| KR | 10-2006-0080607 | 7/2006 |

* cited by examiner

*Primary Examiner* — Bob Phunkulh
(74) *Attorney, Agent, or Firm* — Staas & Halsey LLP

(57) ABSTRACT

A method and apparatus transmitting and receiving in a real-time system are disclosed. The method of transmitting in a real-time system includes scheduling a task included in a socket based on a predetermined transmission option designated to the socket, and transmitting a packet generated by the scheduled task based on the predetermined transmission option, so that real-time communications of a network communication can be secured and resources of the system can be efficiently used, thereby, transmitting and receiving data according to the required characteristics of transmission and reception.

21 Claims, 5 Drawing Sheets

TRANSMITTING AND RECEIVING METHOD AND APPARATUS IN REAL-TIME SYSTEM

CROSS-REFERENCE TO RELATED APPLICATIONS

This application claims the benefit of Korean Patent Application No. 10-2007-0001644, filed on Jan. 5, 2007, in the Korean Intellectual Property Office, the disclosure of which is incorporated herein in its entirety by reference.

BACKGROUND

1. Field

One or more embodiments of the present invention relate to a real-time system, and more particularly, to method and apparatus transmitting and receiving a packet in a real-time system.

2. Description of the Related Art

Nowadays, a real-time system is applied to various fields such as sensor networks, remote-monitoring (RMON), network multimedia, a control robot for communications, and home networks. In such real-time system, a technique for transmitting and receiving data using a network is absolutely essential. In particular, the ability to transmit and receive data in real-time is essential, for example, when multimedia data is periodically transmitted through a uniform bandwidth and when sensor data is transmitted within a predetermined time period.

Various methods to secure real-time communications have been introduced in a conventional real-time system. For example, performing of a mission critical task using an application programming interface (API) provided from a real-time operating system is secured by performing tasks according to their priority or generating a real-time event using a timer. However, a priority resource allocation method cannot secure real-time communications in a network and real-time communications cannot be realized according to the characteristics of required transmission and reception.

SUMMARY

One or more embodiments of the present invention provide a method and apparatus transmitting a packet in a real-time system that secures real-time communications in a network and realizes real-time communications according to the characteristics of required transmission and reception while efficiently using system resources.

One or more embodiments of the present invention also provide a method and apparatus receiving a packet in a real-time system that secures real-time communications in a network and satisfies real-time communications according to the characteristics of required transmission and reception while efficiently using system resources.

One or more embodiments of the present invention also provide a computer readable recording medium having embodied thereon a computer program executing a method of transmitting and receiving a packet in a real-time system that secures real-time communications in a network and satisfies real-time communications according to the characteristics of required transmission and reception while efficiently using system resources.

Additional aspects and/or advantages will be set forth in part in the description which follows and, in part, will be apparent from the description, or may be learned by practice of the invention.

To achieve at least the above and/or other aspects and advantages, embodiments of the present invention include a method of transmitting a packet in a real-time system, the method including, scheduling a task included in a socket based on a predetermined transmission option designated to the socket, and transmitting a packet generated by the scheduled task based on the predetermined transmission option.

To achieve at least the above and/or other aspects and advantages, embodiments of the present invention include a method of receiving a packet in a real-time system, the method including, transmitting a received packet to a task included in a socket based on a predetermined reception option designated to the socket corresponding to the packet, and scheduling the task included in the socket based on the predetermined reception option designated to the socket.

To achieve at least the above and/or other aspects and advantages, embodiments of the present invention include an apparatus for a packet in a real-time system, the apparatus including, a socket scheduler that schedules a task included in a socket based on a predetermined transmission option designated to the socket, and a packet manager that transmits the packet generated by the scheduled task based on the predetermined transmission option.

To achieve at least the above and/or other aspects and advantages, embodiments of the present invention include an apparatus for receiving a packet in a real-time system, the apparatus including, a packet manager that transmits a received packet to a task included in a socket based on a predetermined reception option designated to the socket corresponding to the packet, a socket scheduler that schedules the task included in the socket based on the predetermined reception option designated to the socket.

To achieve at least the above and/or other aspects and advantages, embodiments of the present invention include a computer readable recording medium having embodied thereon a computer program for executing a method including scheduling a task included in a socket based on a predetermined transmission option designated to the socket, and transmitting a packet generated by the scheduled task based on the predetermined transmission option.

To achieve at least the above and/or other aspects and advantages, embodiments of the present invention include a computer readable recording medium having embodied thereon a computer program for executing a method including transmitting a received packet to a task included in a socket based on a predetermined reception option designated to the socket corresponding to the packet, and scheduling the task included in the socket based on the predetermined reception option designated to the socket.

BRIEF DESCRIPTION OF THE DRAWINGS

These and/or other aspects and advantages will become apparent and more readily appreciated from the following description of embodiments, taken in conjunction with the accompanying drawings of which.

DETAILED DESCRIPTION OF EMBODIMENTS

Figure 1:
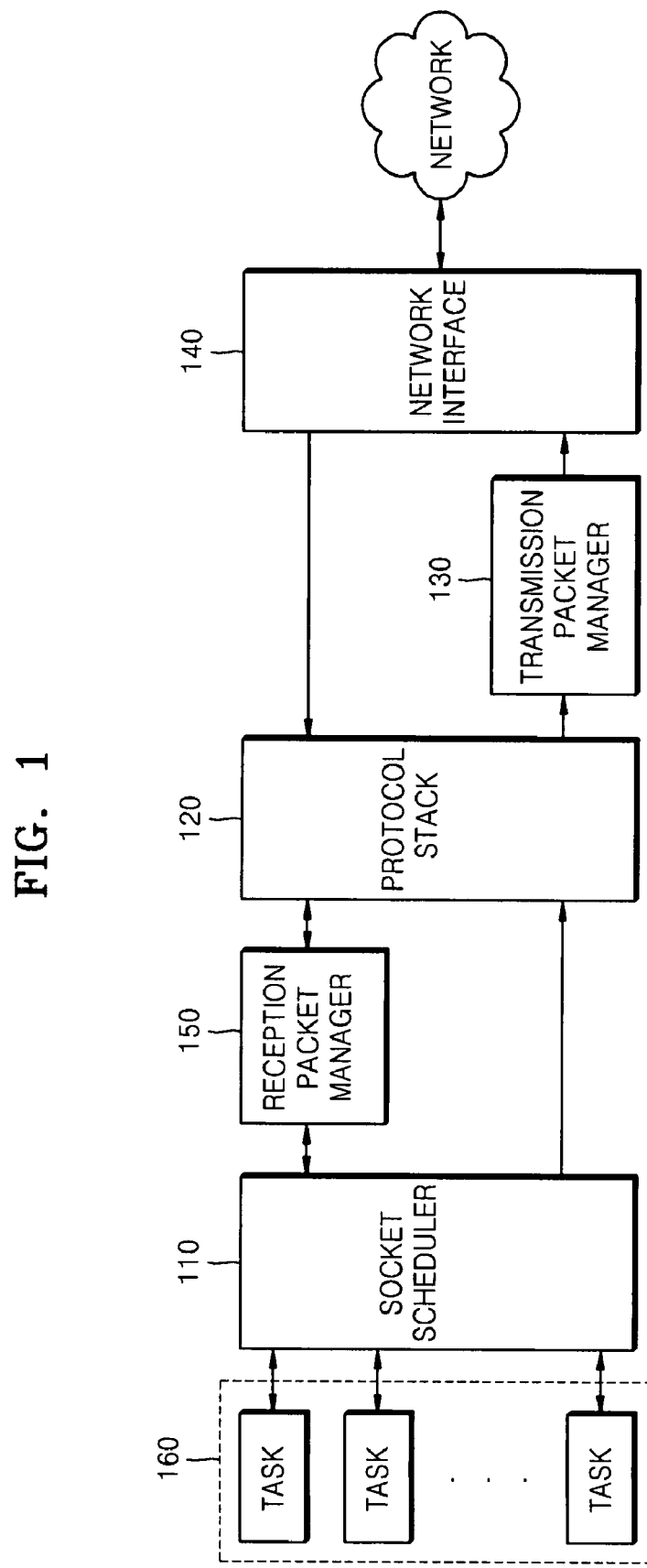
FIG. 1 is a schematic diagram of an apparatus for transmitting and receiving a packet in a real-time system, according to an embodiment of the present invention.

Reference will now be made in detail to embodiments, examples of which are illustrated in the accompanying drawings, wherein like reference numerals refer to the like elements throughout. Embodiments are described below to explain the present invention by referring to the figures.

FIG. 1 is a schematic diagram of an apparatus transmitting and receiving a packet in a real-time system, according to an embodiment of the present invention.

Referring to FIG. 1, the apparatus transmitting and receiving a packet in a real-time system may include, for example, a socket scheduler 110, a protocol stack 120, a transmission packet manager 130, a network interface 140, and a reception packet manager 150.

The socket scheduler 110 may generate sockets when tasks 160 are to communicate with a network. In an embodiment, the socket scheduler 110 may designate an option for transmitting and receiving a packet to a socket that is to be generated. Also, tasks 160 included in the socket that is to be generated may be scheduled according to the designated transmission/reception option by the socket scheduler 110.

The protocol stack 120 controls the flow of the packet that is to be transmitted or received, and may add a header to a transmitted packet or separate an added header from a received packet. The protocol stack 120 may provide various protocols, for example, including unicast, multicast, TCP/IP, and UDP.

The transmission packet manager 130 may transmit the packet generated from the task scheduled by the socket scheduler 110 to a network, through the network interface 140. In an embodiment, the transmission packet manager 130 may transmit the packet to the network based on the transmission/reception option designated to the socket corresponding to the packet that is to be transmitted.

The reception packet manager 150 may transmit the packet received through the network interface 140 and the protocol stack 120 to the task included in the corresponding socket, that is, one of the tasks 160 that is a destination of the received packet, based on the transmission/reception option designated to the corresponding socket.

Figure 2:
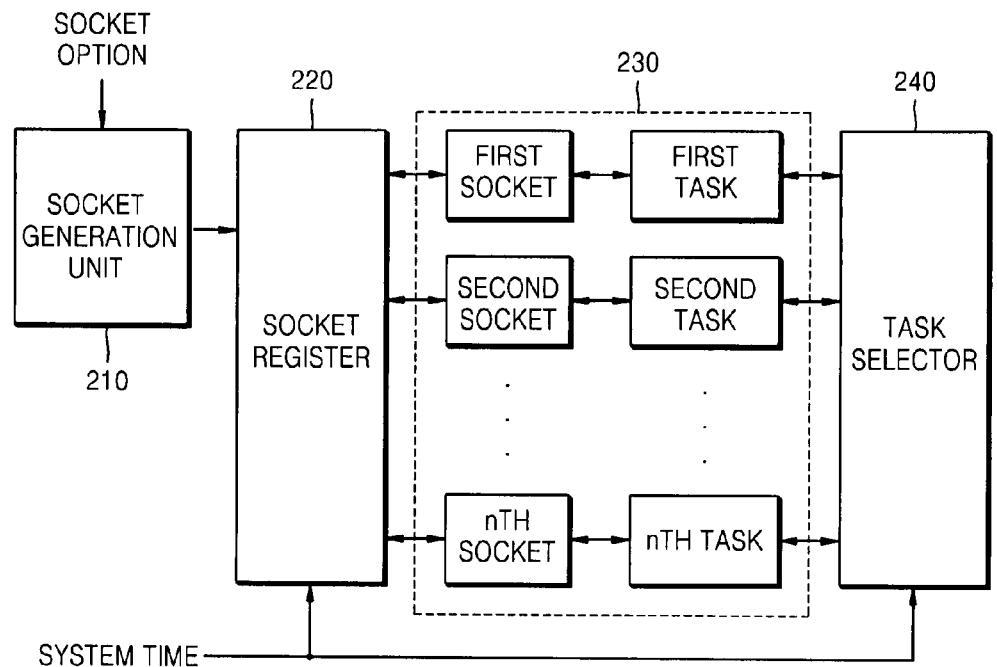
FIG. 2 is a diagram for explaining an operation of a socket scheduler in detail, according to an embodiment of the present invention.

FIG. 2 is a diagram for explaining an operation of the socket scheduler 110 in detail, according to an embodiment of the present invention.

The socket scheduler 110 may include, for example, a socket generation unit 210, a socket register 220, a socket scheduler table 230, and a task selector 240.

The socket generation unit 210 may generate sockets when the tasks 160 are to communicate with the network. In an embodiment, the socket generation unit 210 may designate the option for transmission or reception to the socket that is to be generated. Some examples of the transmission or reception designated options may be as follows.

SO_TXCYCLE: a transmission cycle when a property of a transmission is cyclical.

SO_RXCYCLE: a reception cycle when a property of a reception is cyclical.

SO_TXDEADLINE: a transmission deadline for which the packet should be transmitted within a predetermined time after a transmission request is generated, that is, when a packet should be transmitted based on a transmission deadline.

SO_RXDEADLINE: a reception deadline for which the packet should be transmitted to a specific task within a predetermined time after the packet has entered in a reception packet queue where the packet that entered through the network interface 140 is temporarily stored, that is, when the packet should be transmitted in a reception deadline.

SO_PRIORITY: the priority of a socket.

Among the options above, SO_TXCYCLE, SO_RXCYCLE, SO_TXDEADLINE, and SO_RXDEADLINE may be expressed, for example, in a timer tick of a system or a time unit.

In addition, the options may be designated using a setsockopt function that designates an option to the socket provided from a general socket API. The form of the setsockopt function may be as follows:

int setsockopt (int socket, int level, int optname, void*optval, socklen_t optlen);

The second parameter of the setsockopt function "level" is generally referred to as a level of a socket, that is, which option is to be designated, and the level of the socket may include SOL_SOCKET, IPPROTO_IP, and IPPROTO_TCP. SOL_SOCKET, each of which may be used as the level of the socket to designate the options above. Additionally, the values of the options may be designated while generating the sockets, however, these values may be changed according to requirements even after the sockets are generated.

A process of scheduling a task by the socket scheduler 110 in transmitting may be described as follows.

First, the socket register 220 may determine the deadlines of each socket using the transmission cycle, the transmission deadline, or the system time from among the options designated to the socket. For convenience of explanation, the transmission cycle, the transmission deadline, the system time, and the deadline of the socket may be referred to as $T_p$, $T_{dl}$, $T_s$, and $D_n$ respectively. If only the transmission cycle is designated to the socket option, the socket register 220 may determine the deadline $D_n$ as $D_n = T_s + T_p$, and if only the transmission deadline is designated to the socket option, the socket register 220 may determine the deadline $D_n$ as $D_n = T_s + T_{dl}$. In addition, when both the transmission cycle and the transmission deadline are designated to the socket option, the deadline $D_n$ may be determined as $D_n = \min\{T_s + T_p, T_s + T_{dl}\}$, that is, the minimum value among $T_s + T_p$ and $T_s + T_{dl}$. Also, the socket register 220 may register the socket to the socket scheduler table 230.

The task selector 240 may synchronize with the system time and select the task included in each socket registered in the socket scheduler table 230 according to the deadline $D_n$ designated as above, and thereby may schedule the task. More specifically, the task selector 240 may select and execute the task that is the nearest to approaching the deadline $D_n$ from among the tasks included in the sockets registered in the socket scheduler table 230, that is, the task included in the sockets having the nearest deadline $D_n$ to the system time, so that the selected task may perform a process related to transmission. However, when two or more tasks having an identical deadline $D_n$ exist, the task with the highest priority may be selected from among the options above, so as to be executed according to priority. If two or more tasks both having identical deadlines $D_n$ and priority, a round-robin technique may be used to allocate the CPU time by going around each time slice, e.g., by assigning time slices to each task in equal portions and in order, thereby handling all tasks without priority.

A process of scheduling a task with the socket scheduler 110 when receiving is typically the same as a process of scheduling a task when transmitting, except that the deadline of the socket Dn is embodied using the reception cycle and the reception deadline instead of the transmission cycle Tp and the transmission deadline Tdl. However, in the case of a task that is performed after the packet has been received from the reception packet manager 150; here, if the packet is not received, the process typically cannot be performed.

Figure 3:
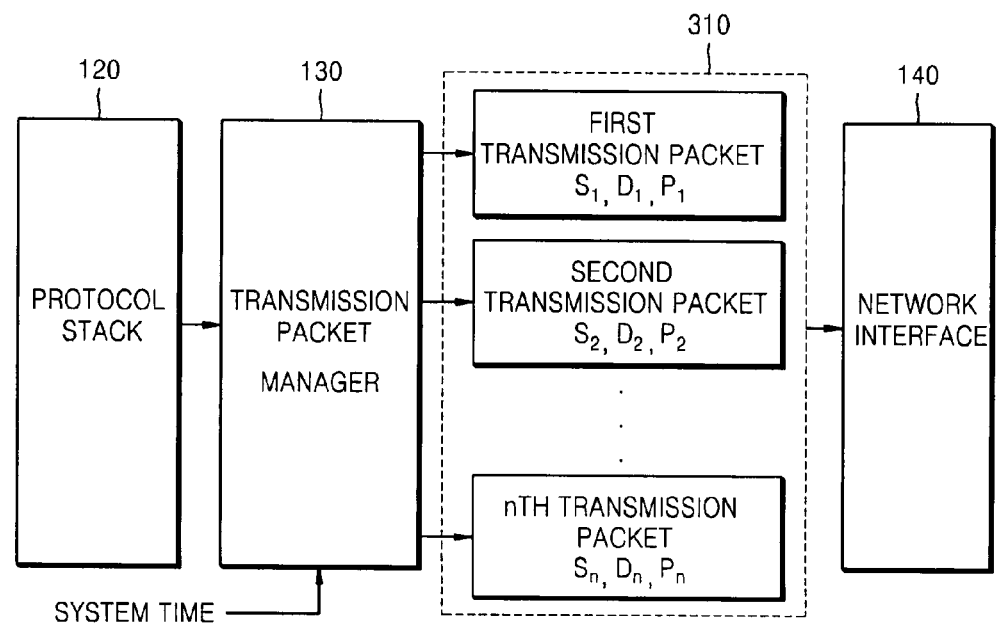
FIG. 3 is a diagram for explaining a transmission packet manager in detail, according to an embodiment of the present invention.

FIG. 3 is a diagram for explaining the transmission packet manager 130 in detail, according to an embodiment of the present invention.

The transmission packet from the protocol stack 120 generally has the properties of a socket that requests transmission of a packet as is, that is, a socket ID Sn, the deadline Dn, and a priority Pn. The socket ID Sn is typically an identifier provided to the socket when the socket is generated, the deadline Dn is typically a value determined in the socket register 220, and the priority Pn is typically the priority determined for the socket in the socket generation unit 210.

The transmission packet manager 130 generally arranges each packet to a transmission packet queue 310 according to the deadline Dn and the priority Pn of each packet. In this case, a sorting algorithm, which is suitable for the applied system, may be used as an arranging method, for example, a timing sort algorithm. In addition, the transmission packet manager 130 may synchronize with the system time and transmit the packets arranged in the transmission packet queue 310 through the network interface 140 according to the deadline Dn and the priority Pn of each packet. More specifically, the packet that is approaching the deadline Dn, that is, the packet having the nearest deadline Dn to the system time, is generally transmitted. However, when two or more packets having the same deadline Dn exist, the packet with the higher priority may be transmitted. When two or more packets both having the same deadline Dn and priority exist, a round-robin technique may be used.

Figure 4:
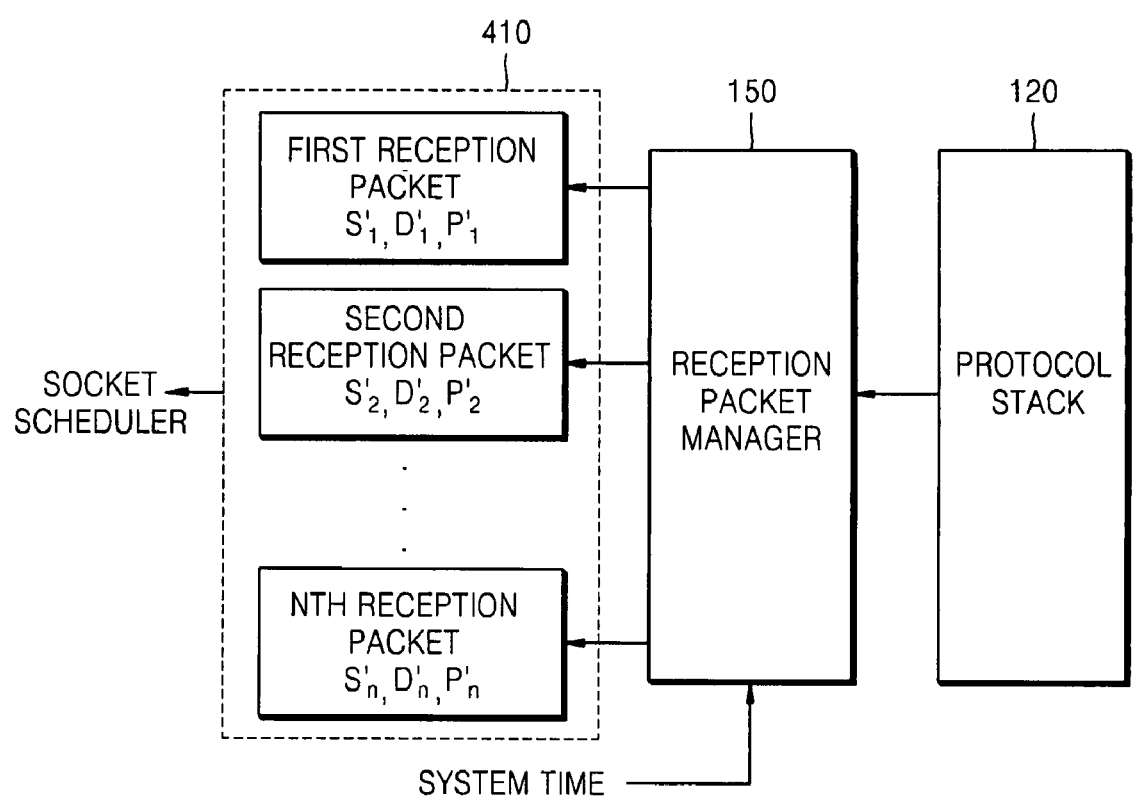
FIG. 4 is a diagram for explaining a reception packet manager in detail, according to an embodiment of the present invention.

FIG. 4 is a diagram for explaining the reception packet manager 150 in detail, according to an embodiment of the present invention.

The received packet from the protocol stack 120 has the properties of a socket that requests reception of a packet as it is, that is, a socket ID Sn', a deadline Dn', and a priority Pn'. The socket ID Sn' is typically an identifier provided to the socket when the socket is generated, the deadline Dn' is typically a value determined in the socket register 220, and the priority Pn' is typically the priority determined for the socket in the socket generation unit 210.

The reception packet manager 150 may arrange each packet to a reception packet queue 410 according to the deadline Dn' and the priority Pn' of each packet. In this case, a sorting algorithm, which is suitable for the applied system, may be used as an arranging method, for example, a timing sort algorithm. In addition, the reception packet manager 150 may synchronize with the system time and transmit the packets arranged in the reception packet queue 410 to one of the specific tasks 160 of the socket scheduler 110, that is, a task included in the socket that requests a reception of the corresponding packet, according to the deadline Dn' and the priority Pn' of each packet. More specifically, the packet that is approaching the deadline Dn', that is, the packet having the nearest deadline Dn' to the system time, is generally transmitted. Meanwhile, when two or more packets having the same deadline Dn' exist, the packet with the higher priority may be transmitted. When two or more packets both having the same deadline Dn' and priority exist, a round-robin technique may be used.

Figure 5:
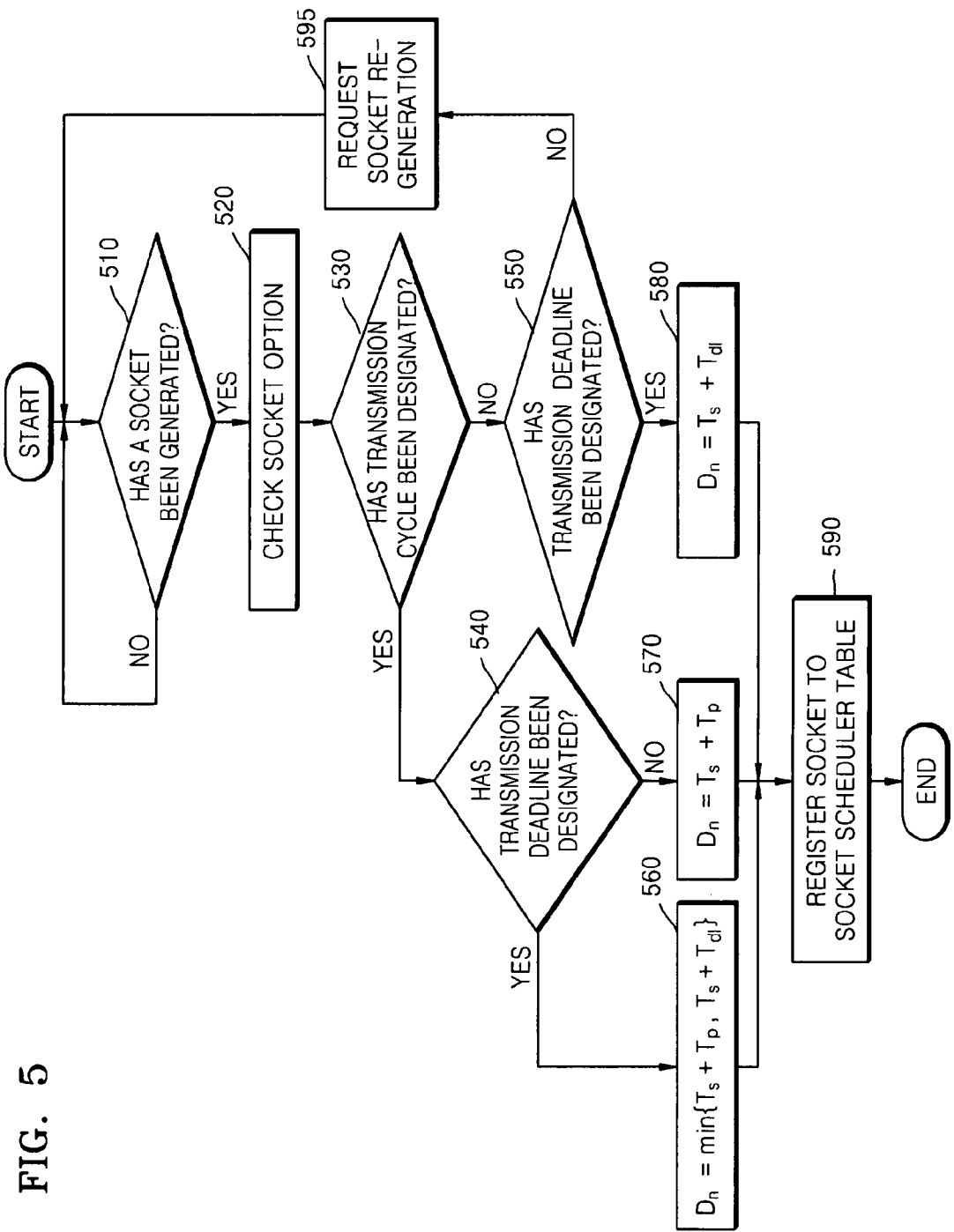
FIG. 5 is a flowchart of a method of determining a deadline of a socket and registering a socket to a socket scheduler table by a socket register, according to an embodiment of the present invention.

FIG. 5 is a flowchart of a method of determining a deadline of a socket and registering a socket, e.g., registering a socket to the socket scheduler table 230 by the socket register 220, according to an embodiment of the present invention. In FIG. 5, the deadline of the socket is determined, wherein the socket requests transmission of the packet.

If a socket is generated in operation 510, a socket option may be checked in operation 520, e.g., by the socket register 220. If it is determined that the transmission cycle Tp has been designated in operation 530, whether the transmission deadline Tdl has been designated may be determined in operation 540. Hence, if it is determined that the transmission deadline Tdl has been designated in operation 540, that is, when both the transmission cycle and the transmission deadline have been designated, the deadline Dn may be determined as Dn=min {Ts+Tp, Ts+Tdl} in operation 560. If it is determined that the transmission deadline Tdl has not been designated in operation 540, that is, if only the transmission cycle Ts has been designated, the deadline Dn may be determined as Dn=Ts+Tp in operation 570.

If it is determined that the transmission cycle Tp has not been designated in operation 530, whether the transmission deadline Tdl has been designated may be determined in operation 550. Here, if it is determined that the transmission deadline Tdl has been designated, that is, if only the transmission deadline Tdl has been designated, the deadline Dn may be determined as Dn=Ts+Tdl in operation 580. If it is determined that the transmission deadline Tdl has not been designated in operation 550, a re-generation of the socket may be requested to the socket generation unit 210 in operation 595.

A determination of a deadline of the socket that requests reception of the packet is generally the same as the determination of the deadline of the socket as described-above where the socket requests transmission of the packet, except that the deadline of the socket is embodied using the reception cycle and the reception deadline instead of the transmission cycle Ts and the transmission deadline Tdl.

Figure 6:
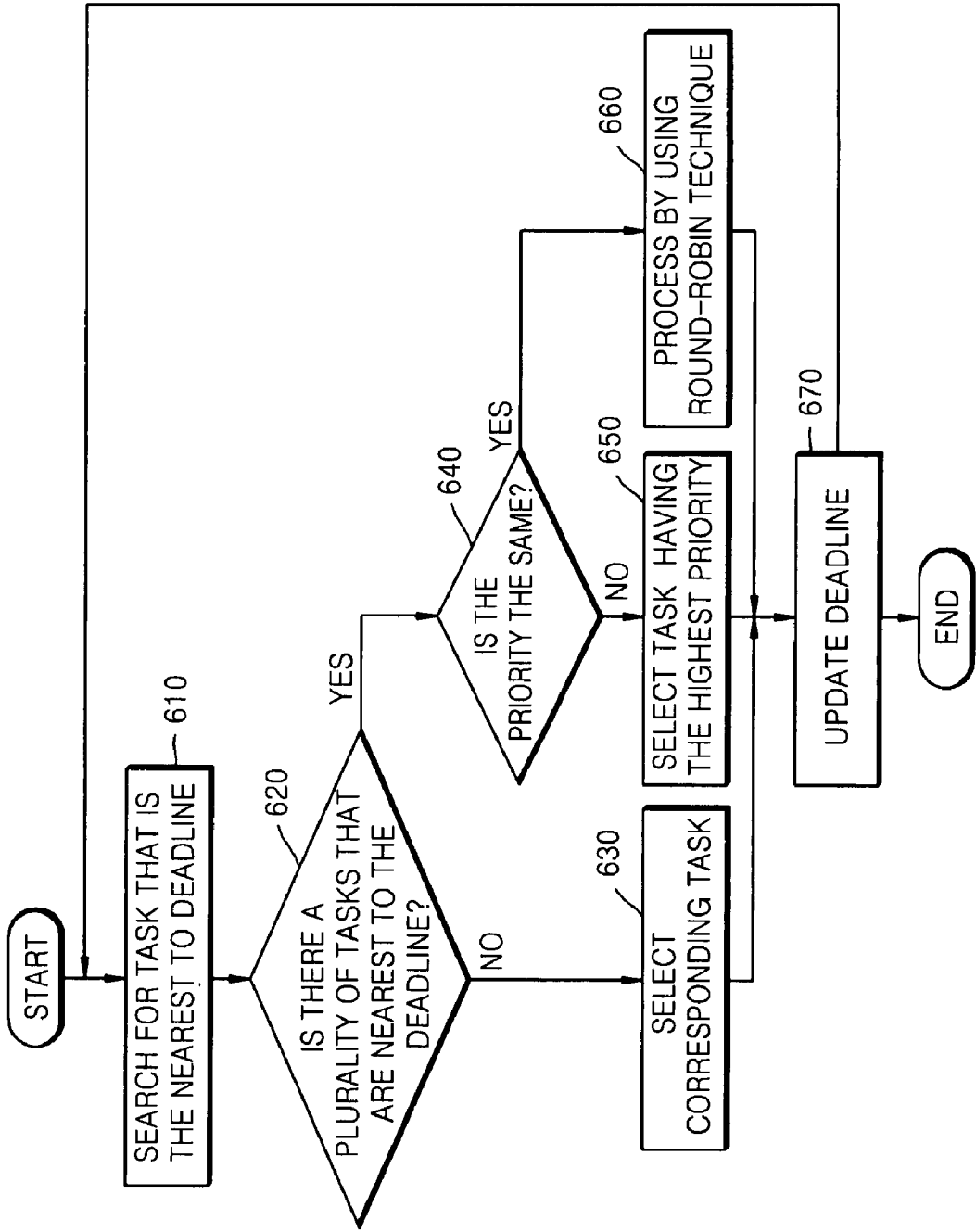
FIG. 6 is a flowchart of a method of scheduling a task after a task selector selects a task, according to an embodiment of the present invention.

FIG. 6 is a flowchart of a method of scheduling a task after a task has been selected, e.g., by the task selector 240, according to an embodiment of the present invention.

In operation 610, the task selector 240 may search for the task that is the nearest to the deadline from among the tasks in the socket scheduler table 230, that is, the task having the nearest deadline to the system time.

In operation 620, the task selector 240 may determine whether there is a plurality of tasks that are nearest to the deadline. Hence, if it is determined that there is not a plurality of tasks in operation 620, operation 630 may be performed. In operation 630, the task selector 240 may select the searched task that is the nearest to the deadline in order for the selected task to be executed.

If it is determined that there is a plurality of tasks that are nearest to the deadline in operation 620, that is, when two or more tasks having the same deadlines exist in operation 620, operation 640 may be performed.

In operation 640, the task selector 240 may determine if the searched tasks have the same priorities. Hence, if it is determined that the tasks do not have the same priorities, operation 650 may be performed. In operation 650, the task selector 240 may select the task having the highest priority in order for the selected task to be executed.

If it is determined that the searched tasks have the same priorities in operation 640, operation 660 may be performed. In operation 660, the task selector 240 may process the tasks using a round-robin technique, for example.

In operation 670, the socket register 220 may update the deadlines of each socket and the process may return to operation 610 to repeatedly perform each of the operations 610 through 670.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as media carrying or including carrier waves, as well as elements of the Internet, for example. Thus, the medium may be such a defined and measurable structure including or carrying a signal or information, such as a device carrying a bitstream, for example, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

According to one or more embodiments of the present invention, the task included in the socket may be scheduled based on the transmission/reception option designated to the socket and the packet generated by the task may be transmitted/received based on the transmission/reception option. Therefore, real-time communications of a network communication may be secured and resources of the system may be efficiently used, thereby transmitting and receiving data according to the characteristics of transmission and reception required.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of transmitting a packet in a real-time system, the method comprising:
   scheduling a task included in a socket considering a transmission property based on a predetermined transmission option designated to the socket, the predetermined transmission option corresponding to the transmission property and comprising at least one of a transmission cycle and a transmission deadline; and
   transmitting a packet generated by the scheduled task based on the predetermined transmission option,
   wherein the scheduling of the task comprises:
   determining a deadline based on at least one of the transmission cycle and the transmission deadline; and
   scheduling the task according to the determined deadline, and
   wherein in the determining of the deadline, deadlines of each socket are determined using a system time and one or more of the transmission cycle and the transmission deadline, from among the options designated to the socket.

2. The method of claim 1, wherein in the determining of the deadline, any one of a total sum of the transmission cycle and the system time and a total sum of the transmission deadline and the system time is determined as the deadline.

3. The method of claim 1, wherein the predetermined transmission option is designated using a setsockopt function.

4. At least one non-transitory medium comprising computer readable code to control at least one processing element to implement the method of claim 1.

5. The method of claim 1, wherein in the determining of the deadline, a total sum of a transmission option expressed as a timer tick of a system or a time unit and the system time is determined as the deadline.

6. A method of transmitting a packet in a real-time system, the method comprising:
   scheduling a task included in a socket considering a transmission property based on a predetermined transmission option designated to the socket, the predetermined transmission option corresponding to the transmission property and comprising at least one of a transmission cycle, a transmission deadline and a priority; and
   transmitting a packet generated by the scheduled task based on the predetermined transmission option,
   wherein the scheduling of the task comprises:
   determining a deadline based on at least one of the transmission cycle and the transmission deadline;
   searching for a task that is nearest in time to the determined deadline; and
   executing the searched task.

7. The method of claim 6,
   wherein the executing of the searched task comprises executing a task having highest priority from among the searched tasks if the number of searched tasks is two or more.

8. The method of claim 7,
   wherein the executing of the searched task further comprises executing the searched tasks using a round-robin technique if the number of searched tasks is two or more and the searched tasks have the same priorities.

9. The method of claim 6, wherein in the transmitting of a packet, the packet is transmitted according to the determined deadline or the priority.

10. A method of receiving a packet in a real-time system, the method comprising:
    transmitting a received packet to a task included in a socket based on a predetermined reception option designated to the socket corresponding to the packet; and
    scheduling the task included in the socket considering a reception property based on the predetermined reception option designated to the socket, the predetermined reception option corresponding to the reception property and comprising at least one of a reception cycle and a reception deadline,
    wherein the scheduling of the task comprises:
    determining a deadline based on at least one of the reception cycle and the reception deadline; and
    scheduling the task according to the determined deadline, and
    wherein in the determining of the deadline, deadlines of each socket are determined using a system time and one or more of the reception cycle and the reception deadline, from among the options designated to the socket.

11. The method of claim 10, wherein in the determining of the deadline, any one of the total sum of the reception cycle and the system time and a total sum of the reception deadline and the system time is determined as the deadline.

12. The method of claim 10, wherein the predetermined reception option is designated using a setsockopt function.

13. At least one non-transitory medium comprising computer readable code to control at least one processing element to implement the method of claim 10.

14. A method of receiving a packet in a real-time system, the method comprising:
- transmitting a received packet to a task included in a socket based on a predetermined reception option designated to the socket corresponding to the packet; and
- scheduling the task included in the socket considering a reception property based on the predetermined reception option designated to the socket, the predetermined reception option corresponding to the reception property and comprising at least one of a reception cycle, a reception deadline and a priority,
- wherein the scheduling of the task comprises:
- determining a deadline based on at least one of the reception cycle and the reception deadline; and
- searching for a task that is nearest in time to the determined deadline; and
- executing the searched task.

15. The method of claim 14,
- wherein the executing of the searched task comprises executing a task having highest priority from among the searched tasks if the number of searched tasks is two or more.

16. An apparatus for a packet in a real-time system, the apparatus comprising:
- a socket scheduler that schedules a task included in a socket considering a transmission property based on a predetermined transmission option designated to the socket, the predetermined transmission option corresponding to the transmission property and comprising at least one of a transmission cycle and a transmission deadline; and
- a packet manager that transmits the packet generated by the scheduled task based on the predetermined transmission option,
- wherein the socket scheduler determines a deadline based on at least one of the transmission cycle and the transmission deadline and schedules the task according to the determined deadline, and
- wherein the deadlines of each socket are determined using a system time and one or more of the transmission cycle and the transmission deadline, from among the options designated to the socket.

17. An apparatus for a packet in a real-time system, the apparatus comprising:
- a socket scheduler that schedules a task included in a socket considering a transmission property based on a predetermined transmission option designated to the socket, the predetermined transmission option corresponding to the transmission property and comprising at least one of a transmission cycle, a transmission deadline and a priority;
- a packet manager that transmits the packet generated by the scheduled task based on the predetermined transmission option,
- wherein the socket scheduler determines a deadline based on at least one of the transmission cycle and the transmission deadline and searches for a task that is nearest in time to the determined deadline and executes the searched task.

18. The apparatus of claim 17, wherein the packet manager transmits the packet according to the determined deadline or the priority.

19. An apparatus for receiving a packet in a real-time system, the apparatus comprising:
- a packet manager that transmits a received packet to a task included in a socket based on a predetermined reception option designated to the socket corresponding to the packet; and
- a socket scheduler that schedules the task included in the socket considering a reception property based on the predetermined reception option designated to the socket, the predetermined reception option corresponding to the reception property and comprising at least one of a reception cycle and a reception deadline,
- wherein the socket scheduler determines a deadline based on at least one of the reception cycle and the reception deadline and schedules the task according to the determined deadline, and
- wherein the deadlines of each socket are determined using a system time and one or more of the reception cycle and the reception deadline, from among the options designated to the socket.

20. An apparatus for receiving a packet in a real-time system, the apparatus comprising:
- a packet manager that transmits a received packet to a task included in a socket based on a predetermined reception option designated to the socket corresponding to the packet; and
- a socket scheduler that schedules the task included in the socket considering a reception property based on the predetermined reception option designated to the socket, the predetermined reception option corresponding to the reception property and comprising at least one of a reception cycle, a reception deadline and a priority,
- wherein the socket scheduler determines a deadline based on at least one of the reception cycle and the reception deadline and searches for a task that is nearest in time to the determined deadline and executes the searched task.

21. The apparatus of claim 20, wherein the packet manager transmits the packet to the task according to the determined deadline or the priority.

* * * * *